United States Patent [19]

Neely

[11] 4,207,995
[45] Jun. 17, 1980

[54] DISPENSING CANISTER WITH COOPERATING SCREW AND AGITATOR

[75] Inventor: Raymond J. Neely, Montgomeryville, Pa.

[73] Assignee: Refreshment Machinery Incorporated, Warminster, Pa.

[21] Appl. No.: 868,161

[22] Filed: Jan. 9, 1978

[51] Int. Cl.² .............................................. G01F 11/00
[52] U.S. Cl. ..................................... 222/231; 222/236
[58] Field of Search ............... 222/231, 236, 241, 240, 222/232, 233, 235, 242, 238, DIG. 1; 220/339, 306, 358, 308; 242/55.53, 68, 68.4

[56] References Cited

U.S. PATENT DOCUMENTS

| 1,812,911 | 7/1931 | Walter | 222/231 |
| 1,944,582 | 1/1934 | Snyder | 242/68 |
| 1,960,778 | 5/1934 | Goss et al. | 222/231 |
| 3,904,074 | 9/1975 | Hoffman et al. | 220/339 |
| 3,923,085 | 12/1975 | Nimer | 222/235 X |

*Primary Examiner*—David A. Scherbel
*Attorney, Agent, or Firm*—Seidel, Gonda, Goldhammer & Panitch

[57] ABSTRACT

The canister is provided with a screw for dispensing granular material from an outlet port in the canister. An agitator is rotatably supported for rotation about an axis generally perpendicular to the axis of rotation of the screw. The agitator has teeth on its outer periphery which mesh with the screw flights of the screw.

9 Claims, 5 Drawing Figures

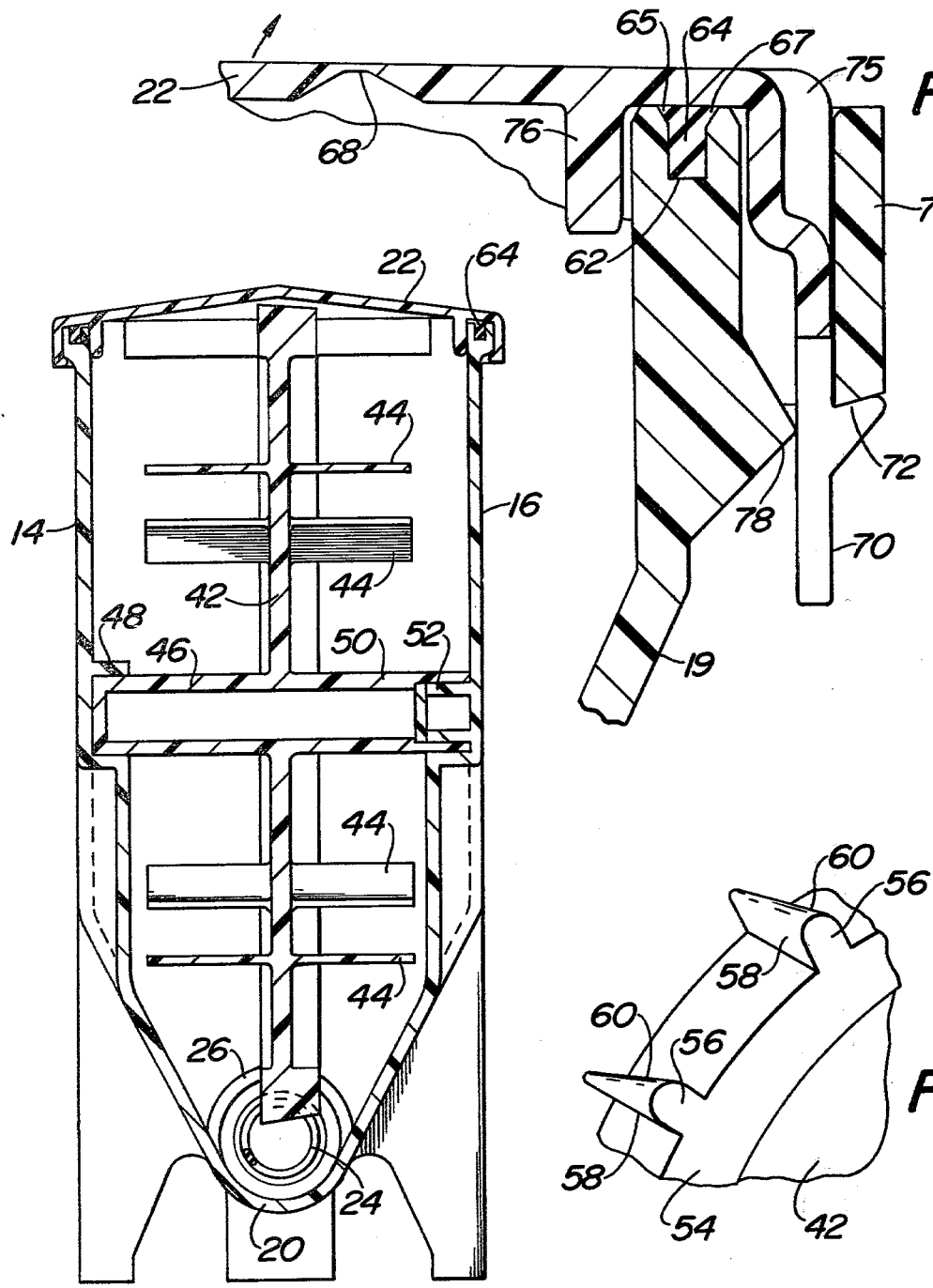

DISPENSING CANISTER WITH COOPERATING SCREW AND AGITATOR

SUMMARY OF THE INVENTION

The dispensing canister of the present invention includes a housing having an access opening selectively closed by a cover. The preferred location of the access opening is at the upper end of the housing. The housing has a dispensing outlet from which granular material may be dispensed. A rotatable screw means is provided in the housing for dispensing granular material through the outlet.

An agitator is supported in the housing for rotation about an axis transverse to the axis of rotation of the screw means. The agitator has a plurality of teeth on its outer periphery. The teeth are meshed with flights of the screw means. The teeth have a side face angled with respect to the axis of rotation of the agitator so as to match with the helix of the screw means and provide blind contact therebetween. Hence, rotation of the screw means also rotates the agitator.

It is an object of the present invention to provide a novel dispensing canister for dispensing granular material in a manner so that the mechanical means for dispensing the granular material also drives an agitator with minimum wear therebetween.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a sectional view taken along the line 3—3 in FIG. 2.

FIG. 4 is a sectional view taken along the line 4—4 in FIG. 1 but on an enlarged scale.

FIG. 5 is a partial perspective view of the outer periphery of the agitator.

Referring to the drawings in detail, wherein like numerals indicate like elements, there is shown in FIG. 1 a dispensing canister in accordance with the present invention designated generally as 10.

Figure 1:
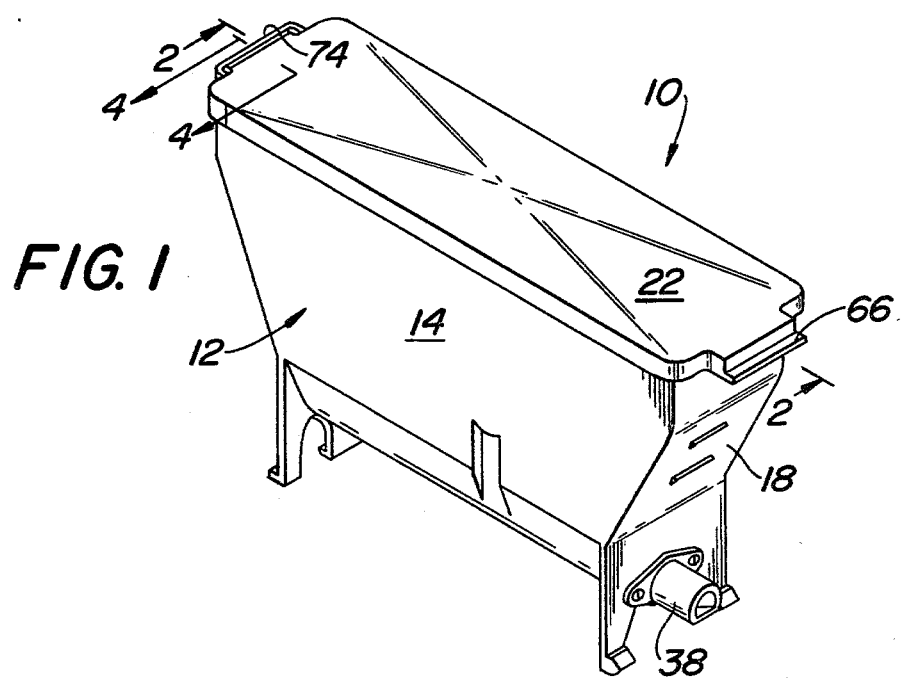
FIG. 1 is a perspective view of a dispensing canister in accordance with the present invention.

The dispensing canister 10 includes an upright housing 12 having oppositely disposed side walls 14, 16 and oppositely disposed end walls 18, 19. The side and end walls are interconnected to one another and preferably are injection molded from a polymeric plastic material integral with the bottom wall 20. Bottom wall 20 tapers inwardly and downwardly from the side walls 14, 16. The housing 12 is provided with an access cover 22 to be described in greater detail hereinafter.

Within the housing 12, there is provided a screw means 24. Screw means 24 is preferably a helically arranged screw made from wire. Other types of screws may be utilized. The screw means 24 extends for substantially the entire length of the housing at the lower end thereof adjacent the bottom wall 20. A guard 26 is attached to end wall 19 and extends inwardly contacting the side walls 14, 16 causing a longitudinal seal. Guard 26 overlies one end portion of the screw means 24 adjacent the location where screw means 24 is connected to a pin 28. Pin 28 extends through a bearing 30 secured in a hole in end wall 19. Bearing 30 is preferably integral in one piece with the guard 26. Bearing 30 is retained in place by a retaining ring 32 having a radial arc so as to perfect a seal and maintain a constant tension between the end wall 19, and a shoulder of guard 26. Pin 28 terminates in a driver 34 adapted to be driven by a motor 36.

Figure 2:
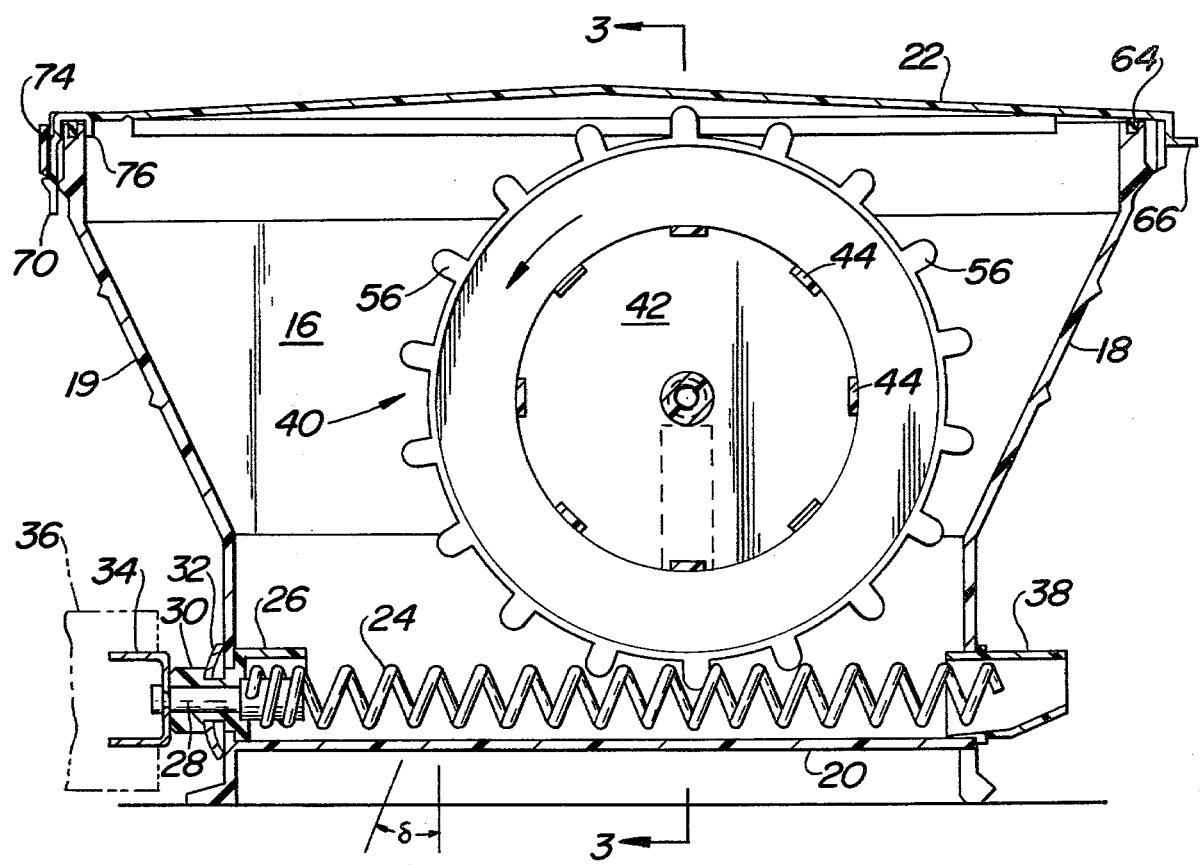
FIG. 2 is a sectional view taken along the line 2—2 in FIG. 1 but on an enlarged scale.

At the opposite end of the screw means 24, the end wall 18 is provided with an opening in which is mounted a spout 38. Spout 38 is secured to end wall 18 in any convenient manner such as by screws. Spout 38 is coaxial with the screw means 24. As shown more clearly in FIG. 2, one end of the screw means 24 extends into the spout 38. Spout 38 constitutes a discharge outlet and through which granular material will be dispensed from the housing 12.

An agitator designated generally as 40 is provided within the housing 14 and supported by the side walls 14 and 16. The agitator 40 includes a vertically disposed disk 42 having a plurality of circumferentially arranged baffles 44 projecting to opposite sides thereof. While eight baffles 44 project from the opposite sides of disk 42, a greater or lesser number may be provided as desired. The disk 42 is provided with an axle 46 on one side thereof and an axle 50 on the other side thereof. Axle 46 is rotatably supported by a cylindrical hub on the inner periphery of wall 14. Axle 50 is hollow at its terminal end portion and receives therewithin a projection 52 on the inner surface of wall 16.

The flexibility of the walls 14 and 16 facilitates installing and removal of the agitator 40. Thus, the walls may be bowed manually away from one another to permit the axle 46 to be received within the hub 48. Axle 46 may be referred to as a male axle while axle 50 may be referred to as a female axle. In this manner, there is only one proper position for the agitator 40. When properly installed, the disk 42 is generally parallel and equally spaced from the side walls 14, 16.

At the periphery of disk 42, it is provided with a circumferential flange 54. Flange 54 is provided with a plurality of teeth 56 circumferentially disposed therearound. While eighteen teeth 56 are shown equally spaced around the periphery of the disk 42, a greater or lesser number may be provided. Each of the teeth 56 has one side face 58 which is disposed 4° off the parallel of the axis of rotation defined by axles 46, 50. Also, each of the teeth has a side face 60 which is disposed at an angle of 18° in the opposite direction off the parallel of the with respect to the axis of rotation defined by axles 46, 50. These angles combine to give maximum tooth cross-section without interfering with the involute curve during transition from tooth to tooth. Thus, as shown in FIG. 5, the teeth are tapered across the width of the flange 54. The angularity of face 60 is chosen so as to match the helix of the screw means 24. Thus, the included angle between faces 58, 60 is 22°. The helix defined by angle α is 18°. When agitator 40 is new, face 60 has point contact with the flights of screw means 24. As the face 60 wears, it approaches increased line contact. The more face 60 wears, the greater the contact and the wear approaches a finite condition over a given period of time. The entire agitator may be an injection molded polymeric plastic such as nylon 6/6.

As the screw means 24 rotates, the agitator 40 will rotate to provide a forward moving action and to assure that the front bottom portion of the housing is completely filled with granular material whereby the same amount of material will be dispensed from spout 38 as a result of a predetermined number of revolutions of screw means 24. It will be noted that the diameter of agitator 40 is large so as to assure that substantially the entire contents of the housing 12 will be subjected to agitation. As shown, the diameter of agitator 40 is as large as can be accommodated within the canister 10 between the screw means 24 and the cover 22.

Agitator 40 is located as close to spout 38 as possible so that the agitator can keep the screw means 24 full at all times. Tests have shown that screw means 24 can continuously discharge a uniform amount even though the rear section is completely empty with as little as 12 grams of total product remaining in the housing.

As shown more clearly in FIG. 4, the upper edge of the housing 12 is sufficiently thick so as to have a groove 62 therein open at the upper edge of the housing. A deformable seal 64 is provided within the groove 62. The groove 62 extends around the entire circumference of the upper end of the housing 12. Cover 22 has a tab 66 (FIG. 1) at one end thereof which snaps over a projection on the end wall 18. Intermediate its ends and adjacent the end wall 19, the cover 22 is provided with a hinge defined by the state of the art as a living or infinite hinge shown by a thin weakened portion 68. See FIG. 4. The cover 22 pivots about hinge 68 between its open and closed positions. The portion of the cover 22 between hinge 68 and end wall 19 remains stationary during movement of the cover 22. The downwardly extending peripheral flange on the cover 22 is slit adjacent the ends of hinge 68.

The stationary portion of the cover 22, to the right of hinge 68 in FIG. 4, is removably secured to the housing 12 by means of a pair of resilient tabs 70. The tabs 70 have a cam projection 72. The tabs 70 extend through a loop 74 suppoted by wall 19. A cam projection 72 on the tab 70 engages a bottom surface on the loop 74. A flange 76 projects downwardly on the inside of wall 19. A projection 78 on the outer peripheral surface of wall 19 extends between the tabs 70. The cover is removable by pressing inwardly on both of the tabs 70 until cam projection 72 clears the bottom surface of loop 74, thereafter the cover is moved upwardly until the tabs 70 have exited from within the loop 74.

As the tabs are inserted into loop 74, projections 72 are cammed inwardly toward wall 19 by contact with the edge of loop 74. Then the tabs snap out when projections 72 clear the bottom surface of loop 74 due to the ribs 75. The ribs 75 prevent the adjacent section of the cover 22 from lifting when opening and closing the cover.

The seal 64 is in contact along its entire length with an inner surface on the cover 22 so as to provide a hermetic seal for the housing 12. The seal 64 is provided with flange portions 65 and 67 which not only permit excellent sealing contact with the inner surface of cover 22 but also prevent collection of foreign or granular material at the uppermost end of groove 62. The collection of foreign or granular material is a problem in prior art constructions when seals having a circular cross-section are used.

In view of the above description, it is believed that the operation of the dispensing canister 10 is readily apparent. Hence, no detailed description of operation is deemed necessary.

The present invention may be embodied in other specific forms without departing from the spirit or essential attributes thereof and, accordingly, reference should be made to the appended claims, rather than to the foregoing specification as indicating the scope of the invention.

It is claimed:

1. A dispensing canister comprising a housing having an access opening selectively closed by a cover, said housing having a dispensing outlet, a rotatable screw means in said housing for dispensing granular material through said outlet, an agitator supported in said housing for rotation about an axis transverse to the axis of rotation of said screw means, said agitator having teeth on an outer peripheral surface therof, some of said teeth being meshed with flights of said screw means, said teeth having a side face angled with respect to the axis of rotation of said agitator and matching the helix of the screw means so as to develop line contact therewith, said agitator being supported by oppositely disposed walls on said housing, said agitator having an axle at its axis of rotation, means for rotatably supporting said axle in any only one proper operative disposition within said housing, said support means including male and female structure cooperating with mating structure on the ends of said axle, said housing and agitator being made from a polymeric plastic material, the oppositely disposed walls of said housing which supports said agitator being sufficiently flexible so that they may be spread apart to facilitate insertion and removal of said agitator.

2. A dispensing canister in accordance with claim 1 wherein said housing has end walls which converge downwardly to a location below which said end walls are vertically disposed, said housing having side walls which are vertically disposed above said location and which coverge downwardly below said location.

3. A dispensing canister comprising a housing having an access opening selectively closed by a cover, said housing having a dispensing outlet, a rotatable screw means in said housing for dispensing granular material through said outlet, an agitator supported in said housing for rotation about an axis transverse to the axis of rotation of said screw means, said agitator having teeth on an outer peripheral surface thereof, some of said teeth being meshed with flights of said screw means, said teeth having a side face angled with respect to the axis of rotation of said agitator and matching the helix of the screw means so as to develop line contact therewith, said cover being provided with a hinge intermediate its ends, said cover having a peripheral flange which surrounds the upper end of said housing, the upper end of said housing having a groove formed therein along its entire periphery, a deformable seal in said groove, said seal having flanges for completely covering said groove, a portion of said cover being in contact with said seal and said seal flanges when said cover is in its closed position.

4. A dispensing canister in accordance with claim 3 including means removably latching a portion of said cover to said housing, the remainder of said cover being pivotable with respect to said portion about said hinge.

5. A dispensing canister in accordance with claim 3 including a bearing for said screw means, said bearing being outside of said housing and connected to a guard for the screw means, said guard being in said housing, and spring means biasing said guard into contact with the adjacent wall of the housing to form a seal therewith, said guard overlying a portion of one end of said screw means.

6. A dispensing canister comprising an upright housing made from a plastic material, said housing having an access opening selectively closed at its upper end by a cover made from a plastic material, said housing having a dispensing outlet at an elevation substantially below said access opening, a rotatable screw means in said housing for dispensing granular material through said outlet, said screw means being rotatable about an axis aligned with said outlet, one end of said screw means being adjacent said outlet, the other end of said screw means having an extension pin, said pin extending through a hole in a wall of said housing for connection to a driving means, an agitator supported in said housing for rotation about a horizontal axis transverse to the direction of rotation of said screw means, said agitator including a circular disk disposed immediately above the axis of rotation of said screw means, said disk being of sufficient diameter so as to extend from a location adjacent said lid to a location adjacent said screw means, said agitator having a plurality of teeth on its outer periphery, some of said teeth being meshed with flights of said screw means, said teeth having a side face angled with respect to the axis or rotation of said disk and matched to the helix of the screw means to provide line contact therebetween, said teeth being disposed entirely between the planes defined by the side faces of said disk, said teeth being wider in a circumferential direction at one side face of said disk than at the opposite side face of the disk, a plurality of baffles extending in an axial direction from opposite sides of said disk at a location radially inwardly from said teeth for agitating the contents of said housing as said disk is rotatably driven by said screw means.

7. A dispensing canister in accordance with claim 6 wherein said disk is provided with a male axle extending from one side thereof and a female axle extending from the opposite side thereof, mating support structure on side walls of said housing for rotatably supporting said axles in a manner so that the disk may be inserted and rotatably suppoted in only one dispostion.

8. A dispensing canister in accordance with claim 6 wherein said cover is provided with a living hinge intermediate its ends so as to facilitate pivotable movement between an open and closed position, and said housing having a spout at said outlet, said one end of said screw means extending into said spout.

9. A dispensing canister comprising a housing having an access opening selectively closed by a cover, said housing having a dispensing outlet, a rotatable screw means in said housing for dispensing granular material through said outlet, an agitator supported in said housing for rotation about an axis transverse to the axis of rotation of said screw means, said agitator having teeth on an outer peripheral surface therof, some of said teeth being meshed with flights of said screw means, said teeth having a side face angled with respect to the axis of rotation of said agitator and matching the helix of the screw means so as to develop line contact therewith, said agitator being supported by oppositely disposed walls on said housing, said agitator having an axle at its axis of rotation, means for rotatably supporting said axle in any and only one proper operative disposition within said housing, said support means including male and female structure cooperating with mating structure on the ends of said axle, a bearing for said screw means, said bearing being outside of said housing and connected to a guard for the screw means, said guard being in said housing, and spring means biasing said guard into contact with the adjacent wall of the housing to form a seal therewith, said guard overlying a portion of one end of said screw means.

* * * * *